Patented Mar. 27, 1934

1,952,666

UNITED STATES PATENT OFFICE 1,952,666

METHOD OR PROCESS OF FREEZING

Benjamin S. Foss, Brookline, Mass., assignor to B. F. Sturtevant Company, Hyde Park, Mass., a corporation of Massachusetts No Drawing. Application November 2, 1929
Serial No. 404,526

2 Claims. (Cl. 99—14)

The present invention relates to a method or process of treating foods and other material.

In the freezing or solidification of foods or other material by the abstraction of heat, it has been found that where such freezing or solidification takes place with comparative slowness so that it extends over a substantial period of time, objectionable changes take place in the food or material, due to the formation of ice crystals which rupture the cells, thereby breaking down the structure and permitting the escape of the juices, as in the case of foods like fish, or due to the separation of the constituents of the material, as for example, the crystallizing out of the sugar from molten sweetened chocolate, or the formation of ice from the water of fruit juices.

If instead of freezing or solidifying food or other materials at a slow rate, this is done very quickly, these objectionable changes in the food or material may be avoided and freezing or solidification will be effected without changes or alterations in the cell structure or character or compositions of the material being treated. As a result, all of the original flavor of the food will be preserved and the composition and character of the food or other material retained in its original form.

To the above end the present invention consists in subjecting the food or other material to the action of a gas at a sufficiently low temperature to cause freezing with such rapidity that the structure and composition of the material is retained in its original form.

A further feature of the present invention consists in the use of gas saturated with water or other liquid, thereby to prevent the drying of the material being frozen.

According to the present invention the food or other material is frozen by subjecting it, preferably while unwrapped or unpackaged, to the direct action of a blast or high velocity current of gas at low temperature, preferably minus 40° F. to minus 60° F. Gas at this temperature striking the food or material to be frozen at high velocity abstracts the heat with great rapidity, causing the quick freezing so necessary for the retention of the original flavor, structure, and composition of the food or other material.

Preferably the velocity of the gas will be from one thousand to three thousand feet per minute, ordinarily preferring the highest possible velocity which will not injure or displace the material to be frozen, in order to secure in most efficient manner the turbulent flow necessary to cause the immediate sweeping away from the surface of the food of the film of gas in contact therewith and the presentation of fresh gas, thereby obtaining the rapid transfer of heat from the food to the gas necessary for quick freezing.

Among the difficulties present when it is attempted to freeze by means of a gas such as air, is the drying or desiccating effect upon the food or material being frozen. Air at 0° F. and below has a very considerable capacity for absorption of moisture, and unless saturated, will absorb it from any exposed moist surface even at this low temperature. Even at minus 10° and minus 20° F., air has a substantial capacity for moisture and will absorb the same, although to a lesser extent, whenever the opportunity offers. Since this capacity of air for moisture increases with each degree of rise in temperature, any warming of the air by the transfer of heat from the material to be frozen increases the drying tendency of the air. Even at as low temperatures as minus 10° and minus 20° F. a slight increase in temperature of the air results in a very material increase in moisture absorbing ability of the air with consequent drying of the food.

I have found that at temperatures of approximately minus 40° F. and lower, the capacity of air for moisture is practically nil so that air at such a low temperature is unable to take up moisture from an exposed moist surface. Furthermore, since air at minus 40° F. and lower contains and can contain practically no moisture, any slight warming of the air by reason of the transfer of heat in the freezing operation has no appreciable effect to increase the moisture capacity so as to produce any substantial drying.

Accordingly, the use of a gas, such as air for example, at a temperature approximately minus 40° F. or lower not only secures quick freezing of the food with the retention of all the original flavor and structure, but also avoids the possibility of drying or desiccating of the food or other material being frozen. Thus I am enabled to freeze fish, meats, and similar foods having exposed moisture-bearing surfaces without wrapping or packaging or in any way preparing or handling the food or employing liquids in direct contact with the food or otherwise to prevent the absorption of moisture therefrom and the drying thereof.

It will be observed that due to the extremely low temperature of the gas which is employed and the high velocity turbulent flow with the consequent rapid transfer of heat from the food to the gas, there is an almost instantaneous freezing of the exposed outer surface. Such immediate surface freezing forms a protective layer envelope or "case hardening" as it might be termed, which tends to retain within the food all the original moisture, effectively preventing its escape from the surface. Thus, even in the event of a substantial increase in temperature of the gas, due to the transfer of heat or otherwise, with resulting increased capacity for moisture, there can be no drying of the interior of the food or material.

After the food or other material is frozen it may be wrapped or packaged (if frozen unwrapped) and may be kept for long periods if maintained at proper temperature.

While I prefer to operate at temperatures so low that the gas has practically no ability or capacity to absorb moisture, there may be conditions, due to the character of the material being frozen or otherwise, where it may be necessary or desirable to use gas at a temperature at which it will have a substantial capacity for moisture. Under such circumstances the gas will be saturated with moisture previous to its application to the material to be frozen, thereby preventing any further absorption of moisture at the temperature of application. Inasmuch as the gas is supplied in sufficient volume and velocity so that only a minimum rise in temperature of the air is permitted, the drying effect will be negligible, so far as certain classes of foods and materials are concerned.

While ordinarily atmospheric air will be used as the freezing medium, it is obvious that other gases, vapors and mixtures of the same, might be employed, for example, gases like hydrogen having a high specific heat. Its capacity for absorbing a large amount of heat per unit of weight might, under certain circumstances, prove desirable, or a nonoxidizing gas or germicidal gas, as conditions required. Also, vapors of oils or other ingredients of the material to be frozen might be used to prevent loss of such substance from the material, or to add desirable additional ingredients thereto.

While ordinarily the freezing medium will be employed at approximately atmospheric pressure, or slightly above or below such pressure, it may be desirable at times to use pressures substantially higher or lower than atmospheric pressure.

Nor is the present invention limited to air or other gas alone as the freezing medium since in its broader aspects it includes the use in connection with such air or gas of the vapors not only of water but also of other liquids or substances in kind and amount to suit the particular conditions of the material being frozen.

Having thus described the invention, what is claimed is:

1. The process of treating food and other material which consists in subjecting the material to the direct action of a gas at a temperature not substantially above minus 40 degrees F. and at a velocity not less than approximately one thousand feet per minute.

2. The process of treating food and other material which consists in exposing the same to the action of a gas at a temperature not above approximately minus 40 degrees F. and at a velocity sufficiently high to produce the turbulent flow thereof whereby quick freezing of the material will be secured without appreciable increase in temperature of the gas with resultant desiccation.

BENJAMIN S. FOSS.